Figure 1:
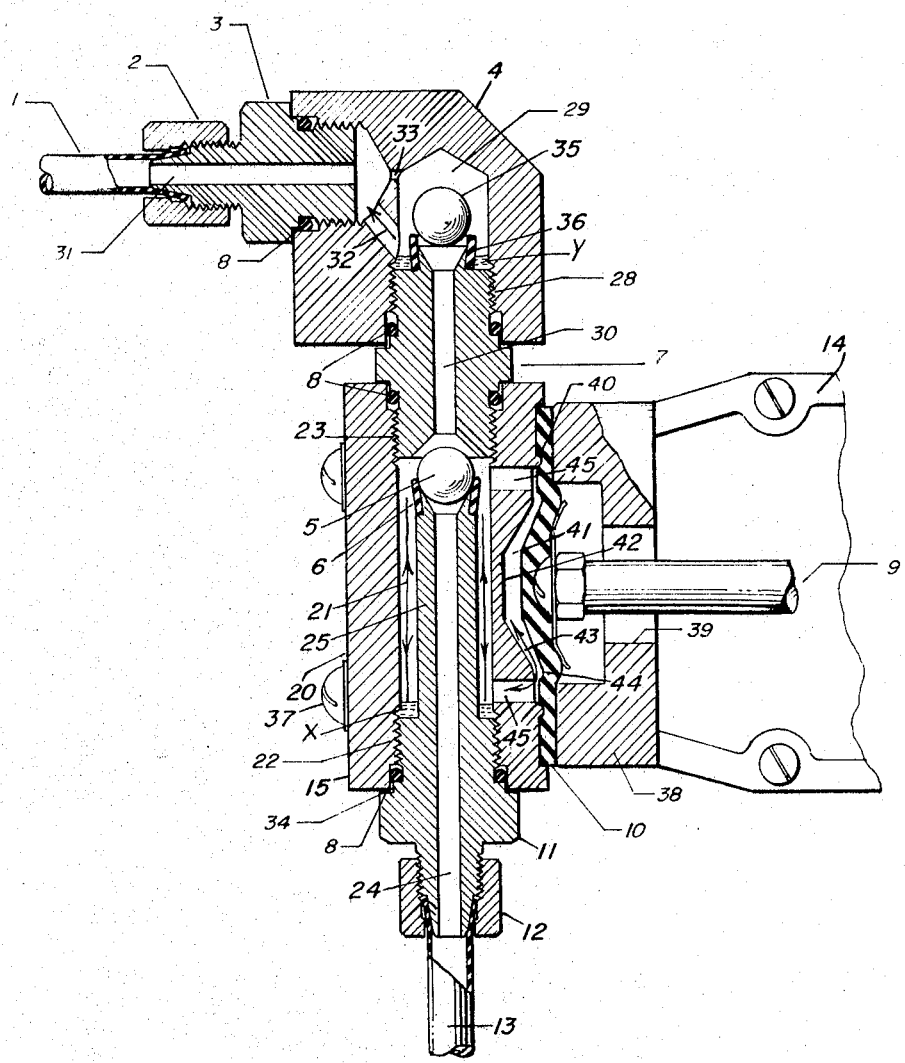

Jan. 17, 1967 H. A. SAVAGE 3,298,319
PUMPING SYSTEM FOR SLURRY AND OTHER SOLUTIONS
Filed Oct. 26, 1964 2 Sheets-Sheet 1

INVENTOR.
HARRY A. SAVAGE.
BY

INVENTOR.
HARRY A. SAVAGE.

3,298,319
PUMPING SYSTEM FOR SLURRY AND OTHER SOLUTIONS
Harry A. Savage, Miami, Fla., assignor of fifty percent to Donald W. Barlow, Miami, Fla.
Filed Oct. 26, 1964, Ser. No. 406,326
4 Claims. (Cl. 103—150)

This invention relates to pumping systems and is more particularly directed to such a system for pumping slurry and other solutions.

The term "slurry" is used to mean a liquid carrying a non-soluble solid in suspension. The prime example of a slurry is diatomaceous earth mixed with water in a filtering system wherein the slurry is pumped to the filter to coat the filter and screen out the foreign particles in the liquid being filtered. Other similar filter materials that are used to form a slurry are perlite volcanic ash, hydrated lime and activated carbon, all of which are insoluble in water, the carrying agent.

The fact that the slurries have undissolved solid materials being carried by a liquid gives rise to the difficulty in pumping the slurry through the system has found to be impractical because the valves in the system were affected by the particles of insoluble material in the liquid. When valves are supposed to close in order to retain suction, a particle of the solid material in the slurry will inevitably become lodged on the valve seat and prevent the valve from closing and render the pump ineffectual to deliver slurry to the filter. At times, the prime of the pump is lost so that even if the particles later become dislodged from the valve, the pump cannot resume its pumping action until the prime has been restored.

The present invention contemplates the prevention of the solid materials in the slurry from interfering with the proper operation of a valve and provides a valve structure for accomplishing same as well as preventing the loss of prime at any time and for any mal-functioning of the flow control system.

Therefore, a principal object of the present invention is to provide a flow control system for slurry and the like with a valve structure which cleans the surface of the valve as the latter arrives at its seated position and flushes the valve as fluid is pumped out of the valve chamber.

Another object of the present invention is to provide a flow control system for slurry and the like with a ball valve having a sleeve shaped valve seat which removes any sediment or particles deposited on the ball valve as the ball valve moves to its seated position on the valve seat and flushes the sediment collected thereon when the valve slides to the open position.

A further object of the present invention is to provide a flow control system for slurry and the like with a vertically disposed valve chamber in which the valve seat is positioned in the upper portion thereof whereby fluid is contained in the valve chamber at all times during the pumping action.

A still further object of the present invention is to provide a flow control system for slurry and the like with a pump having a valve structure of a stand pipe arrangement that permits fluid to be contained in the stand pipe chamber at all times preventing the loss of prime as well as the trapping of air therein which invariably result in the loss of prime to the pump.

With these and other objects in view, the invention will be best understood from a consideration of the following detailed description taken in connection with accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a cross sectional view of a pumping system embodying my invention.

Figure 4:
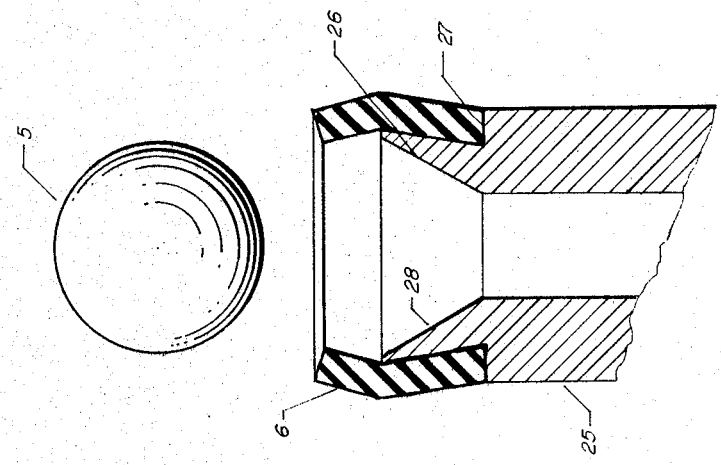
Figure 3:
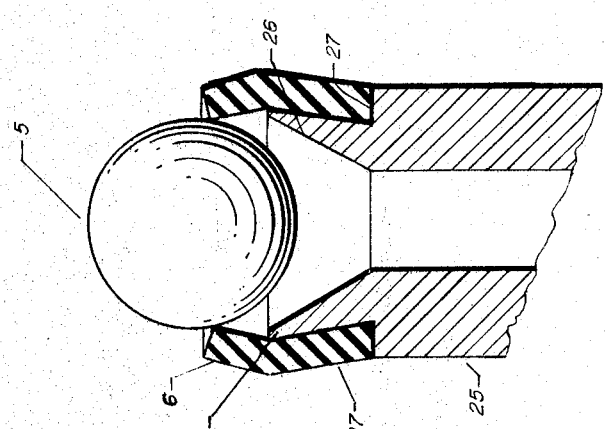
Figure 2:
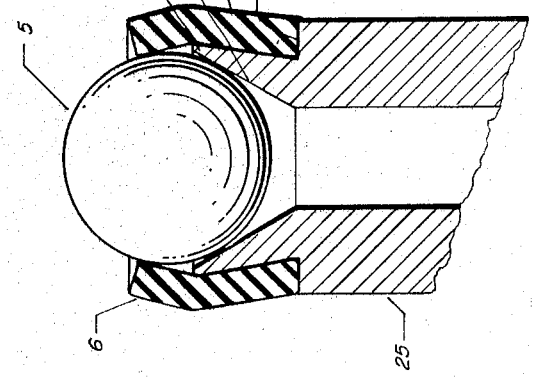

FIGURES 2–4 inclusive are cross sectional views of the valve structure illustrating the cleaning action of the valve effected as the valve moves from the open position, the partially closed position and to the completely closed position respectively.

Referring to the drawings wherein like numerals are used to designate similar parts throughout the several views, the numeral 20 refers generally to a combined pump and valve housing to which a motor (not shown) is operatively connected and supported by a bracket 14, the latter being secured to and forming a part of the combined pump and valve housing 20 as explained in detail hereinafter.

The combined pump and valve housing 20 is provided with a valve chamber 21 at the extremities of which are threaded openings 22 and 23. In the threaded opening 22 there is threadedly mounted an intake fitting 11 while an outlet effluent fitting 7 is threadedly mounted in the opening 23, each of the fittings 7 and 11 being provided with O-rings 8 for sealing the openings 22 and 23 against leakage. The intake fitting 11 is connected to an inlet tubing 13 by a compression nut 12 which tubing communicates with a duct or passageway 24 that extends the full length of a stand pipe 25 terminating as at 126 in the upper portion of the valve chamber 21. The free end 126 of the stand pipe 25 is periferally slotted at an inclined angle on its outer surface as at 127 for receiving the lower end of a sleeve valve seat 6 engaging a shoulder 27, while the inner surface thereof is bevelled as at 26 for forming a further valve seat for a ball valve 5. The sleeve 6 consists of a flexible plastic material of cylindrical shape cut to the proper length. The inside diameter is approximately equal to the shortest diameter of the inclined slotted portion 27 so that upon stretching the sleeve valve seat 6 to fit over the free end 26 of the stand pipe 25, the free end of the sleeve 6 will be inclined toward each other as best shown by FIGURES 2 and 3. It is to be noted that when the ball valve 5 contacts the sleeve valve seat 6 as the ball valve 5 begins to seat (See FIGURE 3) the inner edge of the sleeve 6 engages the surface of the ball valve 5. As the ball valve 5 slides downwardly to its completely seated position as shown by FIGURE 3, the wall of the ball valve 5 is scrapped by the inner edge of the sleeve 6 removing any foreign particles adhering thereto. The surfaces of the ball valve 5 previously scrapped cleaned by the sleeve 6 and the upper inner surface of the sleeve 6 will now engage each other to form a leak free juncture.

The outlet effluent fitting 7 is threaded as at 28 for receiving an outlet valve body member 4 which is provided with a chamber 29 which communicates with the valve chamber 21 through the duct 30 extending along the outlet fitting 7. The free end of the fitting 7 within the chamber 29 is identical in construction to the free end 26 of the stand pipe 25 and provided with a sleeve valve seat 36 and ball valve 35 which are identical with the previously described sleeve 6 and ball valve 5. The cleaning and scrapping action which occurs when the ball valve 5 becomes seated likewise occurs in the seating action of the ball valve 35 on the sleeve 36. A discharge fitting 3 is threadedly connected to the outlet valve body member 4 and communicates therewith by means of a passageway 31 in the fitting 3. A duct 32 in the lower portion of the chamber 29 permits the flow of discharged effluent to flow from the chamber 29 to the passageway 31 to be discharged through a tubing 1 that is connected to the fitting 3 by means of a compression nut 2. A vent 33 in the upper portion of the chamber 29 permits the escape of any air, etc. that may have entered the system and collected in the chamber 29.

The combined pump and valve housing 20 is provided on one side with an opening 34 which is sealed by a cover plate 15 by means of bolts 37 which extend through the housing 20 and fasten a pump head 38 thereto. The pump head 38 is cast integrally with the bracket 14 having an opening 39 through which a pump connecting rod 9 extends. The free end of the connecting rod 9 is secured to a flexible diaphragm 10 having edge portions are engaged by the outer periphery of the pump head 38. A bead 40 is formed on the outer surface of the housing 20 which bead engages the edge portion of the flexible diaphragm 40 to assure against leakage of fluid therealong. The inside surface of the flexible diaphragm conforms with the base of the pump chamber 41 consisting of a flat vertically disposed wall 42 joined by inclined side walls 43. The flexible diaphragm 40 is provided with a shallow slot 44 which permits fluid being pumped out of the chamber 41 to reach the shallow slots 44 and flow out of the chamber 41 into the valve chamber 21 through the ducts 45 which are positioned along the outer edge of the pump chamber 41.

The structure and operation of the motor and pump connecting members which form no part of the present invention is described in detail in my copending application Serial Number 382,098, filed on July 13, 1964, for Duplex Chemical Feeding System. It need be said only that the motor which the connecting rod 9 is connected to causes the flexible diaphragm 10 to reciprocate back and forth in the pump chamber 41 creating alternatingly a suction and pressure in the valve chamber 21.

When the flexible diaphragm 10 moves in a direction away from the base walls 42, 43, suction is created in the pump chamber 41 which is communicated to the valve chamber 21, passageway 24 and tubing 13 connected to a source of slurry. This suction thus created will cause the outlet ball valve 35 to become seated on the sleeve valve seat 36, the latter scraping any particles of undissolved material in the slurry from the valve 35 to permit the valve 35 to seat properly and prevent any loss of suction. At the same time the inlet ball valve 5 will slide upwardly to become unseated and permit slurry to flow through the inlet tubing 13, passageway 24, past the sleeve valve seat 6 into the valve chamber 21 and fill the pump chamber 41 by way of the ducts 45.

When the connecting rod 9 reverses its direction and slides inwardly to force the flexible diaphragm 10 to move in the direction of the base walls 42, 43, the slurry in the pump chamber 41 will be forced out of this chamber through the ports 45 and into the valve chamber 21. This fluid under pressure will cause the inlet ball check valve 5 to slide downwardly in the direction of its seated position. As it slides into sealed position, the walls of the ball valve 5 are scrapped by the upper edge of the sleeve valve seat 6 as explained hereinabove, of any foreign matter that might have adhered to the ball valve 5. The ball valve 5 will seat properly to prevent any loss of pressure while the outlet ball check valve 35 will slide upwardly to its open position. As it remains in its open position, the flow of slurry past the ball valve 35 will flush same and remove any particles of matter adhering thereto. The slurry will be discharged from the chamber 29 through the duct 32, passageway 31 and the discharge tubing 1 to the filter where the slurry is being deposited. Any air being pumped by the pump 10, which may occur when the prime is lost will pass through the vent opening 33 and be discharged from the system through the tubing 1. Also, it is to be noted that there are no places in the system when the slurry may collect while the pump 10 is actuated. Slurry leaving the pump chamber 41 will be discharged through the ducts 45 so that the slurry in the chamber or stand pipe 21 will be moved upwardly therein to be discharged through the passageway 30 and into the chamber 29.

So long as the pump 10 is in action in pumping the slurry from the inlet tubing 13 to be discharged through the outlet tubing 1, the ball valves 5 and 35 will constantly be seated and unseated on their respective sleeve valve seats 6 and 36 during which operation the ball valves 5 and 25 become cleaned of all undissolved particles that are being pumped in a mixture with water. Each stroke of the pump 10 will deliver a specified and fixed quantity of slurry without fail and at no time will the device become clogged due to the slurry becoming stagnated in any part of the device. Also, by having the inlet check valve 5 at the upper portion of the valve chamber 21, the valve chamber 21 will always contain slurry even if the ball valve 5 is maintained in an open position when it should be seated. Therefore, my device can never lose its prime Also, as the ball valves 5 and 25 come to their open position, the undissolved particles which had accumulated about the valve while in the closed position are flushed away by the flow of slurry therealong.

What I claim as new and desire to secure by Letters Patent of the United States is:

1. A pumping system for slurry and other solutions having nonsoluble solids in suspension comprising a pump, means actuating said pump, said pump having a chamber and a duct communicating with said chamber, a valve housing having a vertically disposed chamber, a stand pipe mounted vertically in said valve chamber having a free end at the upper portion of said valve chamber, said stand pipe having a passageway adapted to be connected to a source of slurry, inlet valve means mounted at the free end of said stand pipe in said valve chamber for the control of slurry through said passageway whereby upon the cessation of operation of said pump, the solid materials in suspension will collect in said valve chamber below said inlet valve means, said duct communicating with substantially the lowermost portion of said valve chamber below said inlet valve means, whereby fluid discharged from said pump chamber through said duct will enter said valve chamber at said lowermost portion to compel the flow of fluid along said deposited solid materials and substantially the full length of said valve chamber to remove said solid materials from said valve chamber.

2. A pumping system for slurry and other solutions having nonsoluble solids in suspension comprising a pump, means actuating said pump, said pump having a chamber and a duct communicating with said chamber, a valve housing having a vertically disposed chamber, a stand pipe mounted vertically in said valve chamber having a free end at the upper portion of said valve chamber, said stand pipe having a passageway adapted to be connected to a source of slurry, inlet valve means mounted at the free end of said stand pipe in said valve chamber for the control of slurry through said passageway whereby upon the cessation of operation of said pump the solid materials in suspension will collect in said valve chamber below said inlet valve means, said duct communicating with a substantially lowermost portion of said valve chamber whereby a fluid discharged from said pump chamber through said duct will enter said valve chamber at said lowermost portion to compel the flow of fluid along said deposited solid materials and substantially the full length of said valve chamber to remove said solid materials from said valve chamber, a discharge chamber having a bottom wall outlet valve means mounted substantially above said bottom wall, a fluid passageway connecting said valve chamber and said outlet valve means controlling the discharge of slurry to said discharge chamber and a discharge duct extending to proximity of said bottom wall whereby solids collected on said bottom wall are entrained by said slurry being discharged through said discharge chamber.

3. A pumping system for slurry and other solutions having nonsoluble solids in suspension comprising a pump, means actuating said pump, said pump having a chamber and a duct communicating with said chamber, a valve housing having a vertically disposed chamber, a stand pipe mounted vertically in said valve chamber having a free end at the upper portion of said valve chamber, a sleeve valve seat mounted at said free end of said stand pipe, a ball check valve positioned on said valve seat controlling the flow of slurry into said valve chamber whereby upon the cessation of operation of said pump, the solid materials in suspension will collect in said valve chamber below said ball check valve, said duct communicating with a lowermost portion of said valve chamber whereby fluid discharged from said pump chamber through said duct will enter said valve chamber at said lowermost portion to compel the flow of fluid along said deposited solid materials and substantially the full length of said valve chamber to discharge said solid materials from said valve chamber.

4. A pumping system for slurry and other solutions having nonsoluble solids in suspension comprising a pump, means actuating said pump, said pump having a chamber and a duct communicating with said chamber, a valve housing having a vertically disposed chamber, a stand pipe mounted vertically in said valve chamber having a free end at the upper portion of said valve chamber, said stand pipe having a passageway adapted to be connected to a source of slurry, a sleeve valve seat mounted at said free end of said stand pipe, a ball check valve positioned on said valve seat controlling the flow of slurry into said valve chamber whereby upon cessation of operation of said pump, the solid materials in suspension will collect in said valve chamber below said ball check valve, said duct communicating with a lower portion of said valve chamber whereby fluid discharged from said pump chamber through said ducts will enter said valve chamber at the lower portion to compel the flow of fluid along said deposited solid materials and substantially the full length of said valve chamber, a discharge chamber having a bottom wall outlet valve means mounted substantially above said bottom wall, a fluid passageway connecting said valve chamber and said outlet valve means controlling the discharge of slurry to said discharge chamber and a discharge duct extending to proximity of said bottom wall whereby solids collected on said bottom wall are entrained by said slurry being discharged through said discharge chamber.

References Cited by the Examiner

UNITED STATES PATENTS

| | | | |
|---|---|---|---|
| 1,199,894 | 10/1916 | Hurley | 137—242 |
| 2,491,230 | 12/1949 | Theis | 103—150 |
| 2,747,510 | 5/1956 | Von Seggern | 103—228 |
| 2,839,001 | 6/1958 | Tubbs | 103—228 |
| 2,986,099 | 5/1961 | Guptill | 103—228 |
| 3,002,525 | 10/1961 | Grove | 137—242 |
| 3,091,254 | 5/1963 | Kilayko | 137—516.29 |
| 3,131,638 | 5/1964 | Wilson et al. | 103—150 |

FOREIGN PATENTS

| | | |
|---|---|---|
| 165,861 | 11/1955 | Australia. |
| 892,713 | 8/1953 | Germany. |

DONLEY J. STOCKING, *Primary Examiner.*

MARK W. NEWMAN, *Examiner.*

W. L. FREEH, *Assistant Examiner.*